2,992,991
THERMALLY STABLE VISCOUS COMPOSITION CONTAINING A CHLORFLUORINATED ALKANE OIL

Fred W. West, Paterson, N.J., assignor, by mesne assignments, to Minnesota Mining and Manufacturing Company, St. Paul, Minn., a corporation of Delaware
No Drawing. Filed Mar. 26, 1957, Ser. No. 648,489
10 Claims. (Cl. 252—78)

This invention relates to a high viscosity material and to the preparation thereof. In one aspect this invention relates to a flotation fluid for reducing frictional losses in instruments and machines. Another aspect of this invention relates to a damping fluid for reducing impact and vibration damage and offering viscous non-elastic restraint to moving parts within a gyro. Another aspect of this invention relates to a halogenated, viscous material having a low pour point and high shear stability. Another aspect of this invention relates to a chlorofluorinated lubricating oil having a viscosity which is substantially stable over a wide temperature range. Still another aspect of this invention relates to chlorofluorinated polymers as damping and flotation fluids for gyro mechanisms.

Gyro mechanisms which are used for missile guidance systems, aircraft navigation instruments, fire control systems and navigation instruments on ships have now achieved wide recognition. For some of the improved gyros now being designed there exists a need for a highly viscous, high density material which has a low pour point and which is stable at high temperatures, that is, at temperatures of about 200° F. A gyro in a guided missile, for example, in responding to change in speed, direction and attitude may provide the only stable reference with respect to the earth by which the missile can be navigated. The precision required in the control of high speed, long range missile and aircraft has placed new demands upon gyros. To meet these demands a relatively new gyro has been designed which requires a suitable fluid to buoy the gyro float. Various fluids and waxes have been employed for this purpose but these have not been able to meet the requirements demanded for a material of this type. Typical specifications for a gyro fluid which is used to float the gyro in an integrating machine are presented in Table I.

TABLE I

| Temperature Class, ° F. | Viscosity, cp. | Density, g./cc. | Cloud Point, ° F. |
|---|---|---|---|
| 120 | 3,000 | 1.958 | less than 115. |
| 140 | ¹ 2,800 | 1.949 | less than 135. |
| 160 | 600 | 1.922 | less than 155. |
| 160 | 1,000 | 1.928 | Do. |
| 160 | 2,000 | ¹ 1.930 | Do. |

¹ Greater than.

In other cases, where the restraint to precision in the gyro is supplied by resilient member and where the fluid is not required to float the gyro, the viscosity requirements are much lower than those recorded above in Table I. For example, a viscosity of between about 100 and about 1,000 centipoise at 100° F., may be required. One specification requires a viscosity within this range and a density of about 1.8 at 100° F. Additional desirable characteristics of some of these gyro fluids which has heretofore been unattainable is that they remain liquid at low temperatures, have cloud points not above room temperature while, at the same time, maintain suitable densities and viscosities. Some gyros now in design have small float apparent densities and although a high viscosity is needed, the density may be as low as 1.78 or lower. Thus, it is observed that requirements for gyro fluids may vary considerably depending upon the particular mechanism in which the fluid is to be employed.

Other instruments such as bi-metallic dial type thermometers and chemical seal pulsation dampeners have also indicated a need for a highly viscous material which meets many of the specifications mentioned above.

It is, therefore, an object of the present invention to provide a material having a high viscosity, a low clear point and a low pour point and to provide a method for the preparation thereof.

Another object of this invention is to provide a non-corrosive, thermally stable chlorofluorinated alkane solution suitable for use as a damping and flotation fluid.

Another object of this invention is to provide a chlorofluorinated alkane solution which remains clear at room temperature.

Another object is to provide a fluid containing a polymer of chlorotrifluoroethylene having a viscosity of about 600 centipoise or higher at 140° F., which fluid is essentially non-volatile at temperatures as high as 200° F.

Another object is to provide a polymeric mixture of chlorotrifluoroethylene suitable for use as a damping and flotation fluid in a gyroscope.

Still another object of this invention is to provide a commercially feasible method for the preparation of a chlorofluorinated alkane solution for use as a damping and flotation fluid having the above valuable properties.

Other objects and advantages of the present invention will become apparent to those skilled in the art from the accompanying description and disclosure.

According to this invention a compatible normally solid polymer, such as for example, chlorotrifluoroethylene and vinylidene fluoride copolymer having a specific gravity (Jolly balance) at 75° F. of about 2.02 and a dilute solution viscosity (DSV) of between about 0.5 and about 2.0 at 266° F. is admixed with and dissolved in a chlorofluorinated alkane oil, for example, a polychlorotrifluoroethylene oil. The normally solid polymer and the chlorofluorinated alkane oil are intimately mixed at a temperature between about 20° C. and about 200° C. or higher until a homogeneous solution having a constant viscosity is obtained and the resulting product is a viscous oil having a low pour point, low volatility and high density.

The dilute solution viscosity (DSV) of the normally solid polymer is determined by dissolving a sample of the polymer in dichlorobenzotrifluoride to a concentration of 0.75 weight percent solvent. The sample is mixed with the dichlorobenzotrifluoride in a flask which is placed in a bath at 300° F. and stirred for 3 to 4 hours or until the sample is completely dissolved. The resulting solution is removed from the flask and poured into a modified Ubbelohde viscosimeter equipped with a sinter disk through which the solution is filtered. The viscosimeter is maintained at 266° F. by means of a thermostatically controlled bath. The liquid is drawn up through a graduated, calibrated capillary of the viscosity tube and the time it requires for the liquid to descend from one point in the graduated capillary to another is recorded in seconds. This value is multiplied by the factor of the tube to obtain a value in centistokes. This method of measuring viscosity has been applied to solid polymers having dilute solution viscosities between about 0.5 and about 3 or higher when the polymer is soluble in the solvent at the given temperature.

The chlorofluorinated alkane oil, or major component, of the present invention is an alkane having a minimum density of about 1.7 grams/cc. at 140° F. and containing between 4 and 22 carbon atoms per molecule. The oil is preferably a perchlorofluorinated alkane oil which includes the homopolymer of chlorotrifluoroethylene having a viscosity at 210° F. of between about 1 and about 40 centistokes and a molecular weight of between about 300 and about 1,000 as the most preferred member of this group. Polychlorotrifluoroethylene oils having these properties are represented by the following general formula $$Y(CF_2CFCl)_xZ \qquad (1)$$

wherein $x$ is an integer between 3 and 9 and Y and Z are normally gaseous halogen atoms (fluorine and chlorine atoms) or a moiety derived from an alkyl telogen which is completely halogenated with normally gaseous halogen atoms. The preparation of polychlorotrifluoroethylene oils wherein Y and Z are normally gaseous halogen atoms is given in U.S. Patent 2,770,659. The polychlorotrifluoroethylenes wherein Y and Z are chlorine atoms are prepared by the telomerization of chlorotrifluoroethylene with sulfuryl chloride and are commercially available as Kel-F #1 Oil, which is a mixture of polychlorotrifluoroethylenes having a molecular weight between about 300 and about 500, Kel-F #3 Oil, which is a mixture of polychlorotrifluoroethylenes having a molecular weight between about 500 and about 780 and Kel-F #10 Oil, which is a mixture of polychlorotrifluoroethylenes having a molecular weight between about 780 and about 1,000. The individual oils can be employed separately or any combination of them can be employed and used as the major component.

The preparation of other perchlorotrifluoroethylene oils in this most preferred group wherein Y and Z are moieties derived from an alkyl telogen which is completely halogenated with normally gaseous halogen atoms, such as, for example, chlorotrifluoromethane, trichlorotrifluoroethane, pentachlorotrifluoropropane, etc., is set forth in copending applications of William S. Barnhart, Serial No. 347,186 (filed April 6, 1953), now U.S. 2,875,252, and Serial No. 452,708 (filed August 27, 1954), now abandoned.

Other preferred perchlorofluorinated alkane oils which are useful in the present invention include the following:

$$Cl(CF_2-CFCl)_m-CF_2-CFCl-CF_2Cl \qquad (2)$$

$$F(CF_2)_n-CFCl-CF_2Cl \qquad (3)$$

and $$CF_2Cl-CFCl-(CF_2)_p-CFCl-CF_2Cl \qquad (4)$$

wherein $m$ is an integer between 1 and 9; $n$ is an integer between 2 and 20 and $p$ is an integer between 0 and 18. These perchlorofluorinated alkane oils are obtained from the chlorination of perchlorofluorochlorinated olefins to yield compounds corresponding to Formula 2, and from the chlorination of perfluorinated olefins to yield compounds corresponding to Formulae 3 and 4. The chlorination is carried out with molecular chlorine at a temperature between about 20° C. and about 150° C. for a period of from about 0.5 to about 24 hours. The perchlorofluorinated olefin $Cl(CF_2-CFCl)_m-CF_2-CF=CF_2$, can be derived from the decarboxylation of the perchlorofluoromonocarboxylic acid, $$Cl(CF_2-CFCl)_m-CF_2-CFCl-CF_2-COOH$$

wherein $m$ is an integer between 2 and 9. The decarboxylation is described in U.S. application Serial No. 517,926 filed June 24, 1955, in the names of William S. Barnhart and Robert H. Wade. This olefin can also be prepared by chlorinating the diolefin obtained from the thermal cracking of polychlorotrifluoroethylene at a temperature between about 100° C. and about 500° C. in the presence of steam. In addition to the diolefin obtained from the pyrolysis of polychlorotrifluoroethylene, the monoolefin $CF_2=CF-(CF_2-CFCl)_xCl$ wherein $x$ is an integer between 2 and 9, is also produced. This monoolefin upon chlorination yields compounds corresponding to the perchlorofluorinated compound of Formula 1. Each of the foregoing perchlorofluorinated alkanes may be employed individually or any mixture of the foregoing perchlorofluorinated alkanes may be used as the major component of the present invention.

Some specific examples of the preferred perchlorofluorinated alkane oils which correspond to Formulae 2, 3, and 4 above are:

1,2,4,6,8,9-hexachlorotetradecafluorononane,
1,2,4,6,8,10,11-heptachloroheptadecafluorohendecane,
1,2,4,6,7-pentachloroundecafluoroheptane,
1,2,4,6,8,10,12,14,15-nonachloroperfluoropentadecane,
1,2-dichlorohexadecafluorooctane,
1,2-dichlorooctadecafluorononane,
1,2-dichloroperfluorooctadecane,
1,2-dichloroperfluoroeicosane,
1,2,5,6-tetrachlorodecafluorohexane,
1,2,9,10-tetrachlorooctadecafluorodecane,
1,2,13,14-tetrachloroperfluorotetradecane,
1,2,6,7-tetrachlorohexadecafluorononane,
1,2,3,4-tetrachlorohexafluorobutane, and
1,2-dichlorodecafluoropentane.

Examples of other preferred perchlorofluorinated alkane oils are:

1,2,3,6,7,8-hexachlorododecafluorooctane,
1-chloroperfluorooctane,
1-chloroperfluorodecane,
3,4-dichloroperfluorohexane,
2,3,3,4,4,5-hexachlorooctafluorohexane,
1,1,2,3,4,4-hexachloro-2,3-bis(trifluoromethyl)butane,
2,5-dichloroperfluorohexane,
2,4-dichloro-2-(trifluoromethyl)methyl pentane, and
2,3-dichloro-2,3-bis(trifluoromethyl)butane.

Other chlorofluorinated alkane oils which are suitably used in the process of the present invention are the aliphatic alkane oils which are more than half halogenated. This group includes chlorofluorinated oils prepared by the hydrochlorination of any of the previously mentioned olefins with hydrogen chloride at a temperature between about 50° C. and about 300° C. The compounds formed by the addition of hydrogen chloride to the above mentioned olefins are β-hydrochlorofluorinated alkanes.

Specific examples of some of these alkanes are:

β-hydro-1,4,5-trichlorooctafluoropentane,
β-hydro-1,4,6,8,9-pentachlorotetradecafluorononane,
β-hydro-1-chlorooctafluorobutane,
β-hydro-1-chlorododecafluorohexane,
β-hydro-1-chloroperfluorodecane,
2,8-dihydro-1,9-dichlorohexadecafluorononane,
2,3-dihydro-1,4-dichlorohexafluorobutane,
2,4-dihydro-1,5-dichlorooctafluoropentane, and
2,5-dihydro-1,6-dichlorodecafluorohexane.

Still other chlorofluorinated alkane oils employed as the major component in the fluids of the present invention include the copolymeric oils of chlorotrifluoroethylene and other halogenated aliphatic olefin comonomers, such as, for example, vinylidene fluoride, vinyl fluoride, 1-chloro-1-fluoroethylene, trifluoroethylene, vinylidene chloride and dichlorohexafluorobutene. Of these copolymeric oils the chlorotrifluoroethylene and vinylidene fluoride copolymer is preferred.

The normally solid polymers of the present invention are those which are compatible with the chlorofluorinated alkane oils and which have a DSV between about 0.2 and about 3. The preferred normally solid polymer, or viscosity improver, which is admixed with the chlorofluorinated alkane is the copolymer of chlorotrifluoroethylene and vinylidene fluoride which has a specific gravity at 75° F. of between about 2.0 and about 2.2, a DSV between about 0.5 and about 2.0 at 266° F. and which contains between about 10 mol percent and about 50 mol percent vinylidene fluoride, most preferably between about 15 mol percent and about 35 mol percent vinylidene fluoride. The thermoplastic resin containing between about 15 mol percent and about 35 mol percent vinylidene fluoride is commercially available as Kel-F 800 Resin and its method of preparation is described in U.S. Patent 2,752,332.

Other viscosity improvers which are suitably admixed with the chlorofluorinated alkane oils and which have a DSV at 266° F. of between about 0.2 and about 3 are solid polymers which have a minimum density of about 0.9 at 100° F. Examples of some of these solid polymers are the silicon rubber gums, polymethacrylate, polyvinyl chloride, polystyrene, polydichlorostyrene, polybutene, vinyl chloride and vinylacetate copolymer, vinyl chloride and acrylonitrile copolymer, chlorinated rubbers, ethyl cellulose polymer, cellulose acetate, butyrate polymer, cellulose nitrate polymer and vinyl butyral polymer.

Generally, for good results and ease of mixing, the normally solid polymer should be finely divided. For example, in the case of Kel-F 800 Resin, a particle size below about 250 microns is suitable; however, a particle size which will pass 90 percent through a 100 or higher mesh screen (U.S. Bureau Standards, standard screen series) is preferred.

In accordance with this invention the normally solid polymer is preferably added to the chlorofluorinated alkane oil in an amount between about 2 and about 30 weight percent of the normally solid polymer. The amount of normally solid polymer added to the oil is dependent upon the initial viscosity of the oil and the viscosity required for the end use. Generally, when employing Kel-F #1 Oil up to 30 weight percent of the normally solid polymer may be added; when using Kel-F #3 Oil, it is usually necessary to add an amount above about 20 weight percent of the normally solid polymer. When Kel-F #10 Oil is used, the normally solid polymer is added in an amount which generally varies between about 2.5 and about 15 weight percent of normally solid polymer.

In carrying out the process of the present invention under preferred conditions, the normally solid polymer is added to the chlorofluorinated alkane oil at a temperature between about 100° C. and about 125° C., although, a temperature between about 20° C. and about 250° C. is satisfactory and may be used if desired. The mixture is agitated vigorously for a period of from about 1 to about 100 hours or until a homogeneous solution and a constant viscosity is obtained. To insure the complete homogeneity of the solution, the resulting solution can be filtered to remove any gel-like particles which may be formed in the solution. The filtration step is usually omitted when the solution has achieved complete homogeneity upon being mixed for a sufficient period of time.

Although it is preferable and less time consuming in the mixing of ingredients to add the normally solid polymer to the chlorofluorinated oil, it is also within the scope of the present invention to add the oil to the solid polymer. This is accomplished by mixing a small amount of oil with the solid polymer so as to moisten the particles and then adding the remaining portion of oil to the moistened solid polymer. Generally, this procedure requires a longer period of time with agitation to arrive at a substantially homogeneous solution; for example, a period between about 10 to about 200 hours.

If several concentrations of normally solid polymer are to be prepared in the same chlorofluorinated alkane oil, it is often convenient to prepare a stock solution of the same or of higher normally solid polymer concentration than is required by the most concentrated of the homogeneous solutions desired. To obtain the homogeneous solutions having a lower normally solid polymer concentration, the stock solution or a portion of the stock solution is then diluted accordingly until the required concentration is attained.

The reaction may be carried out in any suitable reactor such as, for example, an open glass flask, a metal reactor, a thermostatically controlled container equipped with a reflux condenser. When using one of the more volatile major components, such as, for example, Kel-F #1 Oil, a reflux condenser is generally employed so that light ends escaping from the solution are returned to the system.

In certain cases, where a high density major component, for example, Kel-F #10 Oil is mixed with a normally solid polymer having high density, the specifications for a particular gyro fluid may require lower density. In these instances a cosolvent such as a hydrocarbon ester containing between about 10 and about 30 carbon atoms can be added to the chlorofluorinated oil before mixing with the solid polymer or the cosolvent can be added to the homogeneous solution after mixing has been accomplished. Examples of such ester additives are dioctylphthalate, di(2-ethylhexyl)phthalate, dioctylazelate, didecylazelate, dihexylsebacate, dibutylglutarate and dioctylsuccinate. When used, these additives are added in an amount between about 0.5 weight percent and about 50 weight percent, preferably 1 weight percent and about 15 weight percent based on the weight of the fluid components.

In other cases the homogeneous solution obtained from the mixing of the chlorofluorinated oil and the normally solid polymer is used directly as a high viscosity fluid in gyro mechanisms and is generally introduced into the gyroscope cavity under vacuum.

The following examples are offered as a better understanding of the present invention and are not to be construed as unnecessarily limiting thereto.

The properties which distinguish the Kel-F Oils #1, 3 and 10 are given below in Table II.

TABLE II

| | Kel-F Oil #1 | Kel-F Oil #3 | Kel-F Oil #10 |
|---|---|---|---|
| Refractive Index, $n_D$ at 77° F. | 1.401 | 1.405 | 1.410 |
| Viscosity in cs.: | | | |
| 100° F. | 3 | 25 | 220 |
| 210° F. | 1 | 3 | 10 |
| Viscosity in cp., 100° F. | 5.6 | 47 | 425 |
| Pour Point, ° F. | −70 | −45 | +30 |
| Heat of Vaporization, K calories per mol | 10.7 | 14.5 | 17.1 |

All of the homogeneous solutions in the following Table III, Examples 1 through 11, had clear points below room temperature (20° C.). These homogeneous solutions were prepared by adding Kel-F 800 Resin (DSV 0.5) to Kel-F Oil in a glass flask equipped with a thermometer and a Hershberg stirrer at a temperature of between about 110° C. and about 120° C. The solution was vigorously stirred for a period of about 30 hours after which a completely homogeneous solution and a constant viscosity was obtained.

TABLE III

HOMOGENEOUS SOLUTIONS OF KEL-F 800 RESIN IN KEL-F OILS

| Example No. | Kel-F 800 Resin, Weight Percent | Kel-F Oil No. | Viscosity in cs. | | Density in g./cc. | | Pour Point, °F. | Volatility, Percent at 311° F. | Viscosity in cp. | | |
|---|---|---|---|---|---|---|---|---|---|---|---|
| | | | 140° F. | 210° F. | 140° F. | 210° F. | | | 140° F. | 210° F. | 68° F. |
| 1 | 2.5 | 1 | 9.41 | 4.23 | 1.7886 | 1.7229 | [1] −80 | | 16.81 | 7.29 | 60.3 |
| 2 | 5.0 | 1 | 38.4 | 13.97 | 1.7907 | 1.7254 | [1] −80 | | 68.6 | 24.5 | 298.5 |
| 3 | 7.5 | 1 | 144 | 45.1 | 1.7958 | 1.7290 | −50 | 60.18 | 258.5 | 77.9 | 1,935 |
| 4 | 10.0 | 1 | 318.9 | 89.87 | 1.8033 | 1.7390 | | | 575 | 156.3 | |
| 5 | 2.5 | 3 | 72.9 | 15.9 | 1.8698 | 1.8095 | −20 | 25.3 | 136 | 28.8 | |
| 6 | 5.0 | 3 | 325 | 61.3 | 1.8728 | 1.8121 | 10 | 25.7 | 609 | 111.2 | |
| 7 | 7.5 | 3 | 1,171 | 191.3 | 1.8753 | 1.8161 | 35 | 24.9 | 2,196 | 347 | |
| 8 | 10.0 | 3 | 4,200.5 | 540.2 | 1.8799 | 1.8207 | 70 | 21.3 | 7,896 | 983.5 | |
| 9 | 2.5 | 10 | 372 | 49.3 | 1.908 | 1.851 | 45 | 6.93 | 710 | 91.3 | |
| 10 | 5.0 | 10 | 1,751 | 185.4 | 1.9099 | 1.852 | 50 | 6.26 | 3,344 | 343 | |
| 11 | 10.0 | 10 | | 1,373.8 | 1.9138 | 1.8565 | 85 | 7.31 | [2] 50,000 | 2,550 | |

[1] Less than.
[2] Estimated value.

The volatility of the products in Table III above was determined by nitrogen-jet evaporation. This method is carried out by evaporating a sample of the homogeneous solution by a stream of nitrogen preheated to 311° C. The solution is evaporated for a predetermined period of time which corresponds to the time required to evaporate 50 percent of a similar quantity of n-cetane. The volatility is expressed as percent evaporated.

The examples in the following Table IV show the properties of homogeneous solutions prepared by mixing Kel-F 800 Resin with a perchlorofluorinated alkane oil.

TABLE IV

HOMOGENEOUS SOLUTIONS OF KEL-F 800 RESIN IN 1,1,3,5,6-PENTACHLORONONAFLUOROHEXANE

| Example No. | Kel-F 800 Resin | | Viscosity in cs. | | Density, grams/cc. | | Pour Point, °F. | Viscosity in cp. at 100° F. |
|---|---|---|---|---|---|---|---|---|
| | Wt. Percent | DSV | 100° F. | 210° F. | 68° F. | 100° F. (estimated) | | |
| 12 | 1.0 | 1.946 | 88.1 | 21.0 | 1.843 | 1.81 | less than −90 | 158 |
| 13 | 1.5 | 1.946 | 159.6 | 37.3 | 1.843 | 1.81 | less than −90 | 290 |
| 14 | 2.0 | 1.946 | 680.0 | 128.0 | 1.843 | 1.81 | −85 | 1,230 |
| 15 | 2.0 | 1.946 | 579.0 | 107.0 | 1.843 | 1.81 | −80 | |
| 16 | 2.0 | 0.56 | 1.99 | 6.0 | | | less than −80 | |
| 17 | 7.5 | 0.56 | 81.6 | 17.7 | 1.850 | 1.82 | less than −80 | 149 |
| 18 | 10.0 | 0.56 | 214.4 | 36.5 | 1.855 | 1.825 | −60 | 390 |
| 19 | 10.0 | 0.56 | about 390 | | 1.85 | | −60 | |
| 20 | 1.0 | 1.43 | 27.82 | 7.91 | 1.840 | | less than −85 | 50.3 |
| 21 | 2.0 | 1.43 | 323.35 | 67.45 | 1.843 | | less than −80 | 585 |
| 22 | 3.0 | 1.43 | 2,135 | 352.0 | 1.847 | | −80 | 3,820 |

HOMOGENEOUS SOLUTIONS OF KEL-F 800 RESIN IN 1,1,3,5,7,8-HEXACHLORODODECAFLUOROOCTANE

| | | | | | | | | |
|---|---|---|---|---|---|---|---|---|
| 23 | 1.0 | 1.946 | 169.9 | 28.8 | 1.898 | 1.87 | −85 | 318 |
| 24 | 2.0 | 1.946 | 2,868.4 | 200.5 | 1.905 | | −30 | 5,360 |
| 25 | 2.0 | 0.56 | 26.53 | 4.82 | 1.903 | | less than −70 | 49.6 |
| 26 | 5.0 | 0.56 | 234.6 | 23.44 | | 1.87 | −25 | 437 |

HOMOGENEOUS SOLUTIONS OF SILICONE POLYMER (DOW CORNING-CENTISTOKES AT 25° C.=2.0) IN 1,1,3,5,7,9,11,12-OCTACHLOROPERFLUORODODECAN

| | Silicone, Wt. Percent | Viscosity | | | Pour Point, °F. | Density at 68° F. |
|---|---|---|---|---|---|---|
| | | cs. at 210° F. | cs. at 100° F. | cp. at 100° F. | | |
| 27 | 1 | 6.29 | 104.5 | 198.5 | 40 | 1.932 |

All of the above homogeneous solutions had clear points below room temperature.
1,1,3,5,6-pentachlorononafluorohexane has a viscosity in centistokes at 100° F. of 1.87 and at 210° F. of 0.75; a density at 68° F. of 1.840; a pour point of less than −90° F.; and a viscosity in centipoises at 100° F. of 3.4.
1,1,3,5,7,8-hexachlorododecafluorooctane has a viscosity in centistokes at 100° F. of 5.78 and at 210° F. of 1.45; a density at 68° F. of 1.893; a pour point of −70° F. and a viscosity in centipoises at 100° F. of 10.7.
Some other silicone polymers which may be used in place of silicone polymer from Dow Corning are the silicone rubber gums supplied by General Electric and designated as SE-76, SE-52, SE-30, SE-51, SE-33 and SE-31.

All of the homogeneous solutions in the above Table IV, Examples 12 through 27, have clear points below room temperature (20° C.). These homogeneous solutions were prepared by adding the normally solid polymer to the perchlorofluorinated alkane oil at a temperature of about 100° C. The solution was vigorously agitated for a period of about 24 hours after which a completely homogenous solution having a constant viscosity was obtained.

*Example 28*

This example illustrates the effect of a hydrocarbon ester when included in the homogeneous solution recipe.

Ingredients: Weight percent
Kel–F #10 oil _____ 89.6
Kel–F 800 Resin _____ 6.2
Di(2-ethylhexyl)phthalate _____ 4.2

The ingredients were mixed at room temperature and the solution was heated to 1150° F. and stirred for a period of about 24 hours. The resulting homogeneous solution had the following properties:

Viscosity at 140° F. _____ 1895 centipoise.
Density at 140° F. _____ 1.819 grams/cc.
Pour point _____ 30° F.

This solution had a lower viscosity, density and pour point than a solution containing about the same amount of Kel–F #10 Oil or Kel–F 800 Resin (compare with Examples 10 and 11).

The following examples in Table V show properties of additional homogeneous solutions prepared by mixing Kel–F 800 Resin having a DSV of 0.5 with Kel–F #10 Oil.

TABLE V

HOMOGENEOUS SOLUTIONS OF KEL-F #10 OIL AND KEL-F 800 RESIN (DSV 0.5)

| Example | Weight Percent Kel-F 800 Resin | DSV | Viscosity in cp./° F. | Density at ° F. | Pour Point ±5° F. |
|---|---|---|---|---|---|
| 29 | 5.6 | 0.5 | 1,910/160 | 1.8943 at 160 | 45 |
| 30 | 4.6 | 0.5 | 1,101/160 | 1.8944 at 160 | 45 |
| 31 | 3.4 | 0.5 | 566/160 | 1.8895 at 160 | 40 |
| 32 | 1.8 | 0.5 | 277/150 | 1.8982 at 150 | 30 |
| 33 | 2.85 | 0.5 | 1,827/120 | 1.9720 at 120 | 40 |

It is to be understood, without departing from the scope of this invention, that any of the other normally solid polymers having a DSV between about 0.4 and about 3 may be admixed with any of the chlorofluorinated alkane oils, particularly any of the perchlorofluorinated alkane oils, having a minimum density of about 1.7 grams per cc. at 140° F. to provide highly viscous materials suitable for use as damping fluids, flotation fluids and highly viscous lubricants. The preparation of these viscous materials follows the method set forth in the application for which many modifications and embodiments may become apparent to those skilled in the art.

The fluid products of this invention find application as highly viscous thermally stable materials having low cloud points, low pour points and high density. These materials are well suited for use in gyro mechanisms of various design and in other similar applications such as, for example, in bi-metallic dial type thermometers and as chemical seal pulsation dampeners.

The products of this invention are also useful as chemical, thermal and shear resistant lubricants which have wide application in industry today.

Having thus described my invention I claim:

1. A homogeneous liquid solution for use as a gyro fluid which comprises a major amount of a perchlorofluorinated alkane oil having a minimum density of about 1.7 grams/cc. at 140° F. and containing between 4 and 22 carbon atoms per molecule and between about 2 and about 30 weight percent of a soluble, normally solid copolymer of chlorotrifluoroethylene and vinylidene fluoride having a dilute solution viscosity between about 0.2 and about 3 and containing between about 15 and about 35 mol percent vinylidene fluoride.

2. The homogeneous solution of claim 1 wherein the perchlorofluorinated alkane oil is a mixture of polychlorotrifluoroethylenes having a molecular weight of between about 300 and about 500.

3. The homogeneous solution of claim 1 wherein the perchlorofluorinated alkane oil is a mixture of polychlorotrifluoroethylenes having a molecular weight of between about 500 and about 780.

4. The homogeneous solution of claim 1 wherein the perchlorofluorinated alkane oil is a mixture of polychlorotrifluoroethylenes having a molecular weight between about 780 and about 1,000.

5. The homogeneous solution of claim 1 wherein the perchlorofluorinated alkane oil is 1,1,3,5,6-pentachlorononafluorohexane.

6. The homogeneous solution of claim 1 wherein the perchlorofluorinated alkane oil is 1,1,3,5,7,8-hexachlorododecafluorooctane.

7. A homogeneous liquid solution for use as a gyro fluid which comprises a major amount of a perchlorofluorinated alkane oil having a minimum density of about 1.7 grams/cc. at 140° F. and containing between 4 and 22 carbon atoms per molecule; between about 2 and about 30 weight percent (based on said alkane oil) of a soluble, normally solid copolymer of chlorotrifluoroethylene and vinylidene fluoride having a dilute solution viscosity between about 0.2 and about 3 and containing between about 15 and about 35 mol percent vinylidene fluoride; and between about 0.5 and about 50 weight percent (based on the total weight of fluid components) of a hydrocarbon ester having between about 10 and 30 carbon atoms per molecule.

8. The homogeneous solution of claim 7 wherein the hydrocarbon ester is di-(2-ethylhexyl)phthalate.

9. In the method of operating a gyro mechanism containing a gyro operating in a fluid medium the improvement which consists of using as said fluid medium a homogeneous liquid solution comprising (1) between about 2 and about 30 weight percent of a soluble, normally solid copolymer of chlorotrifluoroethylene and vinylidene fluoride having a dilute solution viscosity between about 0.2 and about 3 and containing between about 15 and about 35 mol percent vinylidene fluoride, and (2) a major amount of a chlorofluorinated alkane oil having a minimum density of about 1.7 grams/cc. at 140° F. and containing between 4 and 22 carbon atoms per molecule.

10. In the method of operating the gyro mechanism containing a gyro operating in a fluid medium the improvement which consists of using as said fluid medium a homogeneous liquid solution comprising (1) between about 2 and about 30 weight percent of a soluble, normally solid copolymer of chlorotrifluoroethylene and vinylidene fluoride having a dilute volution viscosity between about 0.2 and about 3 and containing between about 15 and about 35 mol percent vinylidene fluoride, and (2) a major amount of a chlorofluorinated alkane oil having a minimum density of about 1.7 grams/cc. at 140° F., containing between 4 and 22 carbon atoms per molecule, and having an average molecular weight between about 300 and about 1000.

References Cited in the file of this patent

UNITED STATES PATENTS

| | | |
|---|---|---|
| 2,583,588 | Calvin | Jan. 29, 1952 |
| 2,584,222 | O'Connor | Feb. 5, 1952 |
| 2,738,343 | Dittmann et al. | Mar. 13, 1956 |
| 2,742,510 | Davis | Apr. 17, 1956 |
| 2,748,098 | Passino | May 29, 1956 |
| 2,766,157 | Peterson | Oct. 9, 1956 |
| 2,770,615 | Kroncke | Nov. 13, 1956 |
| 2,770,659 | Barnhart | Nov. 13, 1956 |
| 2,837,550 | Prober | June 3, 1958 |

FOREIGN PATENTS

| | | |
|---|---|---|
| 734,644 | Great Britain | Aug. 3, 1955 |

UNITED STATES PATENT OFFICE

CERTIFICATE OF CORRECTION

Patent No. 2,992,991                                                 July 18, 1961

Fred W. West

It is hereby certified that error appears in the above numbered patent requiring correction and that the said Letters Patent should read as corrected below.

Columns 7 and 8, TABLE IV, in the heading to the third part thereof, for "-OCTACHLOROPERFLUORODODECAN" read --- OCTACHLOROPERFLUORODODECANE --; column 9, TABLE V, column 5, line 5 thereof, for "1,9720" read -- 1.9270 --.

Signed and sealed this 16th day of January 1962.

(SEAL)
Attest:

ERNEST W. SWIDER                                        DAVID L. LADD
Attesting Officer                                           Commissioner of Patents